United States Patent
McEllen et al.

(10) Patent No.: US 8,450,612 B2
(45) Date of Patent: May 28, 2013

(54) ANTI-THEFT MARKING FOR COPPER CLAD STEEL

(75) Inventors: Robert McEllen, Hickory, NC (US); Paul Bedder, Conover, NC (US); David Cady, Hickory, NC (US); James Lamb, Conover, NC (US)

(73) Assignee: CommScope, Inc., Hickory, NC (US)

( * ) Notice: Subject to any disclaimer, the term of this patent is extended or adjusted under 35 U.S.C. 154(b) by 486 days.

(21) Appl. No.: 12/705,242

(22) Filed: Feb. 12, 2010

(65) Prior Publication Data

US 2010/0200266 A1    Aug. 12, 2010

Related U.S. Application Data

(60) Provisional application No. 61/152,130, filed on Feb. 12, 2009.

(51) Int. Cl.
*H01B 7/18* (2006.01)
*H01B 5/00* (2006.01)
*H01B 5/08* (2006.01)

(52) U.S. Cl.
USPC ..... 174/103; 174/112; 174/102 A; 174/126.2; 174/128.1; 174/128.2

(58) Field of Classification Search
None
See application file for complete search history.

(56) References Cited

U.S. PATENT DOCUMENTS

| | | | |
|---|---|---|---|
| 4,227,061 A | 10/1980 | Westfall et al. | |
| 4,331,283 A | 5/1982 | Fraser | |
| 4,686,153 A * | 8/1987 | Tominaga et al. | 428/610 |
| 4,819,858 A | 4/1989 | Malone et al. | |
| 5,170,015 A * | 12/1992 | Kudo et al. | 174/128.1 |
| 5,350,885 A * | 9/1994 | Falciglia et al. | 174/112 |
| 6,136,434 A * | 10/2000 | Jang et al. | 428/372 |
| 2004/0112628 A1 | 6/2004 | Brandi et al. | |

FOREIGN PATENT DOCUMENTS

| | | |
|---|---|---|
| JP | 05-337742 A | 12/1993 |
| JP | 09-115352 A | 5/1997 |
| JP | 10-021754 A | 1/1998 |
| KR | 10-0374033 B1 | 2/2003 |

OTHER PUBLICATIONS

John Laumer, "Meth Heads Go for Recycling," Treehugger, A Discovery Company, Internet Site, Dec. 6, 2007, http://www.treehugger.com/files/2007/12/meth$_{13}$ heads$_{13}$ copp.php.

Greg Weger, "Free Copper and Generators!", Above Ground Level, agl Magazine, Aug./Sep. 2008, pp. 32-35 and 47, and pp. 1-5 from the Internet Site: http://www.tessco.com/yts/industry/products/infra/infrastructure/sitehardware/copper$_{13}$ theft.html.

* cited by examiner

*Primary Examiner* — Jayprakash N Gandhi
*Assistant Examiner* — Dion Ferguson
(74) *Attorney, Agent, or Firm* — Muncy, Geissler, Olds & Lowe, PLLC

(57) ABSTRACT

A copper clad steel (CCS) wire is at least partially covered on its exterior to visibly distinguish the CCS wire from a pure/solid copper wire. A coating, such as tin, zinc or paint, covers at least portions of the CCS wire. The coating may be applied in strips, rings or a helix to identify the CCS wire as not be formed of solid copper. In the instance of a stranded CCS wire, one or more of the outer strands may be partially or entirely coated to give the overall stranded CCS wire a distinguishing outer structure.

7 Claims, 8 Drawing Sheets

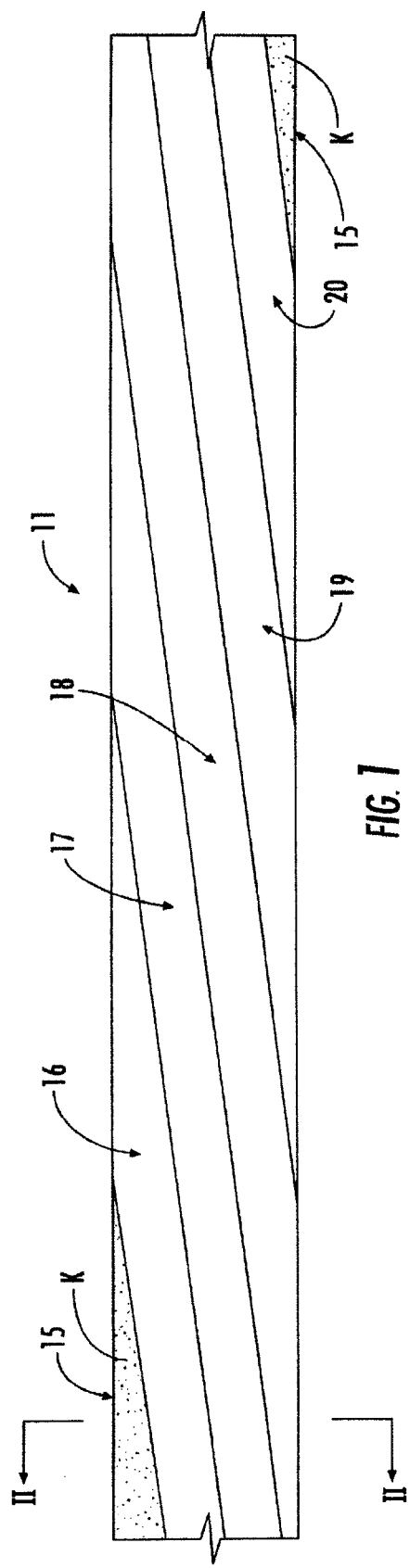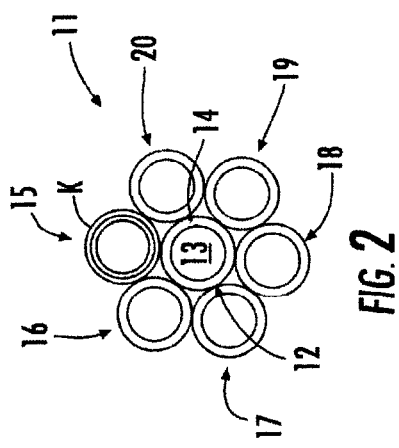

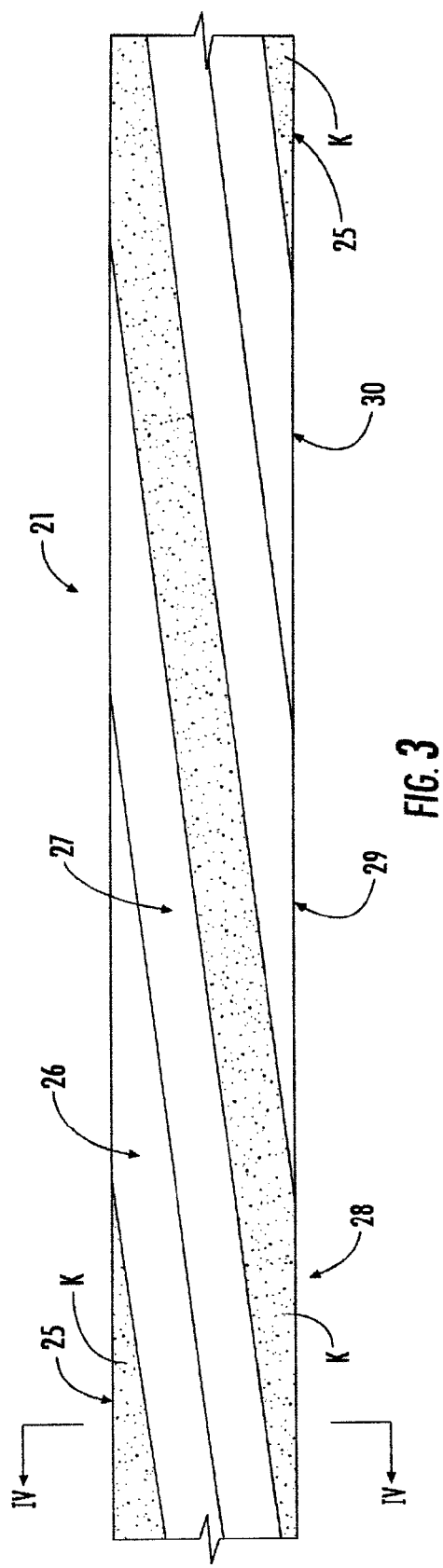
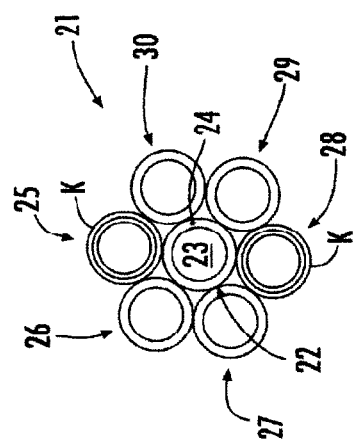
FIG. 3
FIG. 4

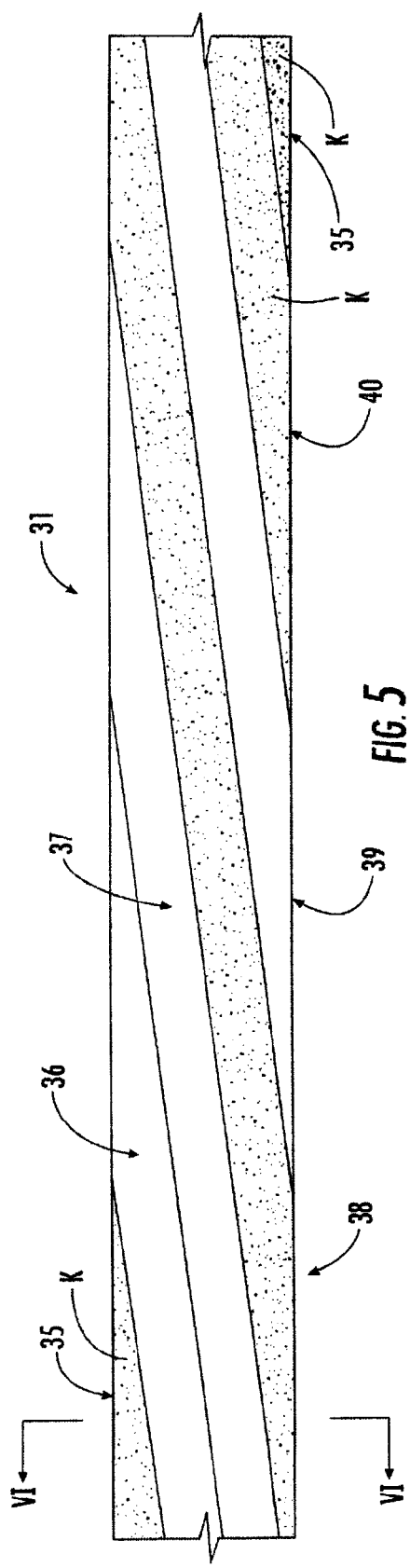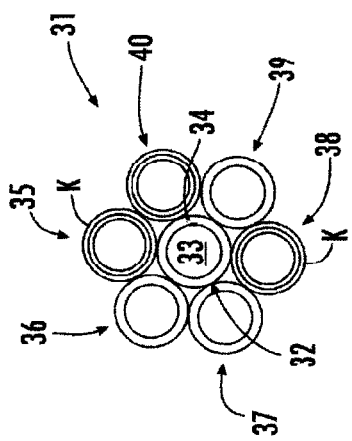

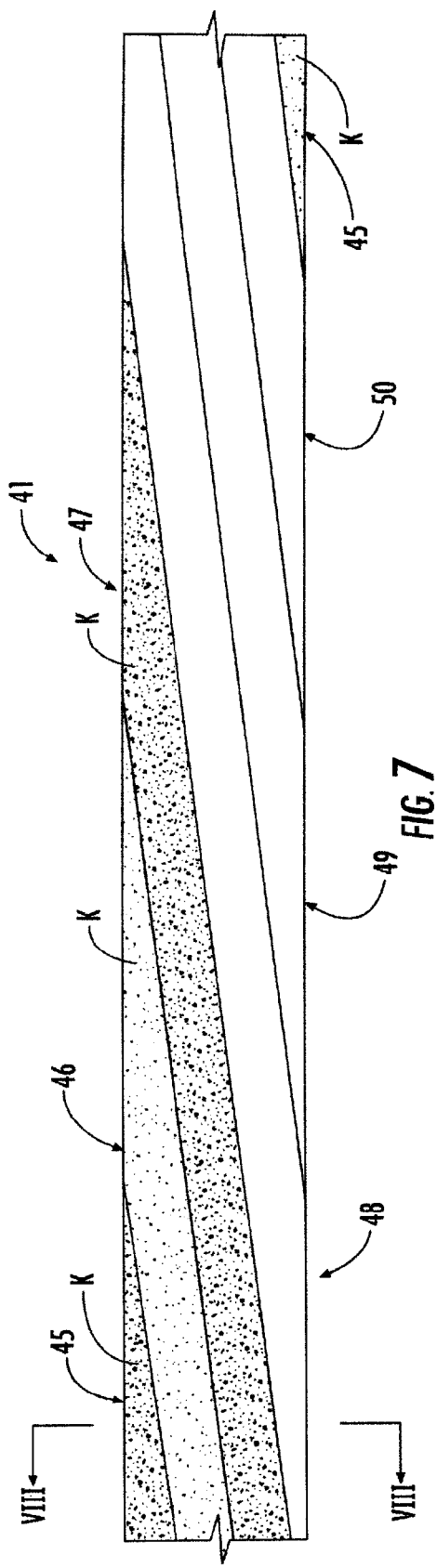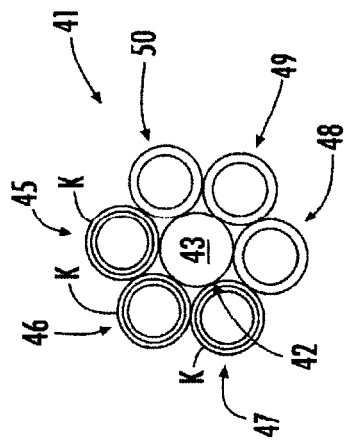
FIG. 7
FIG. 8

ANTI-THEFT MARKING FOR COPPER CLAD STEEL

This application claims the benefit of U.S. Provisional Application No. 61/152,130, filed Feb. 12, 2009, the entire contents of which are herein incorporated by reference.

BACKGROUND OF THE INVENTION

1. Field of the Invention

The present invention relates to a conductive wire. More particularly, the present invention relates to a copper clad steel (CCS) wire with an indicator to deter theft of the wire.

2. Description of the Related Art

Utility companies, such as companies supplying power, television, telephone, cellular services, etc., are presently experiencing a dramatic increase in theft of materials. With the value of copper being very high, copper equipment and most particularly copper wires are being stolen and sold to recycling facilities for the scrap value of the copper. Sometimes the copper is stolen from the storage lots or warehouses of the utility company or from a job site during construction. However, the more troubling and dangerous occurrence is when a thief steals copper wires and other copper elements (e.g., ground bars) directly from a completed and functioning utility site. For example, grounding wires from functioning utility poles and/or equipment cabinets have been stolen. The cost for this later type of theft includes not only the replacement of the copper wiring, but also the coincidental damages to the interrelated equipment (e.g., short circuit damage to interconnected equipment, cabinet lock damage), as well as the technician labor costs and customer outage costs.

There have been several measures recently taken to address the problems of copper theft. Such measures are discussed at http://www.treehugger.com/files/2007/12/meth_heads_copp.php and http://www.tessco.com/yts/industry/products/infra/infrastructure/sitehardware/copper_theft.html.

One particularly advantageous method of mitigating the costs of copper theft has been the replacement of copper wires with copper clad steel (CCS) wires. A CCS wire has a center core of steel and only a thin layer of copper surrounding the steel wire.

A CCS wire is stronger that a wire of pure copper. The wire can be less expensive. Since current is primary carried on the outer surface of a wire, the copper cladding layer allows the wire to have comparable performance characteristics to a pure copper wire.

A CCS wire has little recycle value. The CCS wire is primarily steel, which has a much lower recycle value than copper. Further, the processes for removing the thin copper layer from the steel wire are expensive. Hence, it is basically not worth stealing a CCS wire for its recycle value.

SUMMARY OF THE INVENTION

Applicants have appreciated drawbacks with the CCS wires of the background art.

A CCS wire looks identical to a pure copper wire on its outer periphery. Just like a gold plated ring would appear to be a solid gold ring with a high value, a CCS wire would appear to be a pure copper wire with a high recycle value. By the outer appearance of the CCS wire, the thief would have an incentive to steal the CCS wire. Perhaps the thief would discover the CCS wire was not pure copper after the wire was cut and the cross section was inspected to reveal the inner steel core. However, once the wire is cut the damage has been done to the utility system, outages may have occurred, technicians will need to respond to the scene, and danger to humans may have been created, especially if the cut wire was a grounding wire. Also, the thief might cut other wires just to see if other wires are pure copper wires or the CCS wires, which creates more potential damages and dangers.

Therefore, the Applicants have appreciated a need in the art for a CCS wire which presents a unique or distinguishing appearance on its surfaces visible to a potential thief to deter its theft.

In one embodiment of the present invention, a copper clad steel (CCS) ground wire has a unique appearance to distinguish the CCS wire from a pure copper wire. It is intended that the different appearance will alert the criminal to the different structuring of the wire, as compared to the typical pure copper wires previously stolen by that thief. Moreover, it is intended that thieves will come to learn that the new wire's appearance signifies a CCS wire, which is not valuable as recyclable material and hence would not justify their efforts and/or their exposure to the risk of being caught.

It is an object of the present invention to address one or more of the drawbacks of the background art and/or Applicants' appreciated needs in the art.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 1 is a side view of a CCS wire in accordance with a first embodiment of the present invention;

FIG. 2 is a cross sectional view taken along line II-II in FIG. 1;

FIG. 3 is a side view of a CCS wire in accordance with a second embodiment of the present invention;

FIG. 4 is a cross sectional view taken along line IV-IV in FIG. 3;

FIG. 5 is a side view of a CCS wire in accordance with a third embodiment of the present invention;

FIG. 6 is a cross sectional view taken along line VI-VI in FIG. 5;

FIG. 7 is a side view of a CCS wire in accordance with a fourth embodiment of the present invention;

FIG. 8 is a cross sectional view taken along line VIII-VIII in FIG. 7;

DETAILED DESCRIPTION OF EMBODIMENTS OF THE INVENTION

Figure 9:
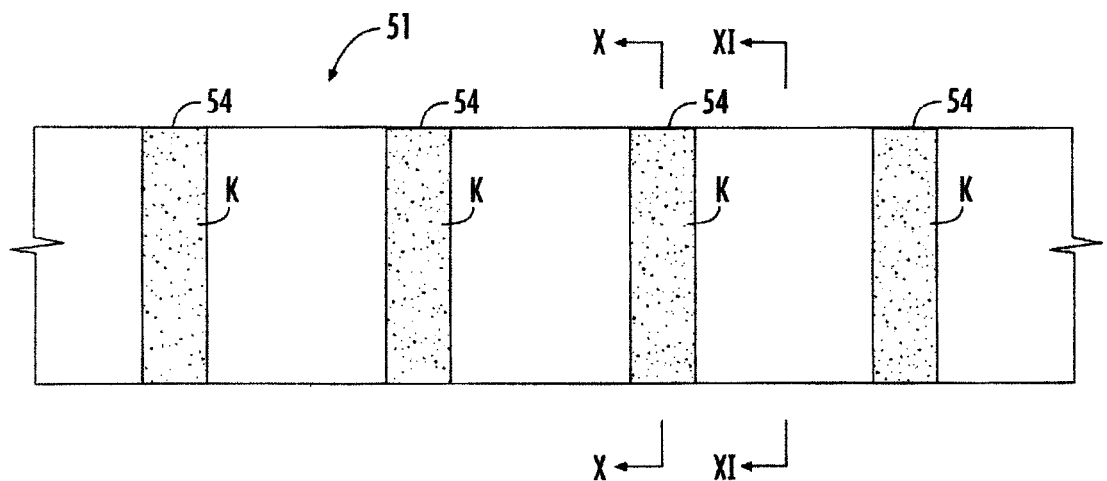
FIG. 9 is a side view of a CCS wire in accordance with a fifth embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

In one embodiment of the present invention, a copper clad steel (CCS) wire (such as a ground wire) has a distinct appearance added to its structure. The visible structural characteristic identifies the wire as being different from a pure copper wire to deter theft of the wire. A ground wire or grounding wire, in accordance with the present invention, may be a solid wire or a stranded wire. A grounding wire, in accordance with the present invention, would have a relatively large diameter, such as a diameter equal to or greater than 12 American wire gauge (AWG)(about 0.0808 inches or greater). In a preferred embodiment, the grounding wire has a diameter equal to or greater than 10 AWG (about 0.1019 inches or greater), e.g., 10 AWG, 8 AWG, 6 AWG, 4 AWG or 2 AWG.

FIGS. 1 and 2 show a wire 11, such as a grounding wire, in accordance with a first embodiment. The wire 11 includes a center wire 12. In one instance, the center wire 12 has a steel core 13 and a copper clad layer 14 surrounding the steel core 13. However, in other instances (such as FIGS. 7 and 8), the center wire 12 could be an all steel wire.

A plurality of outer copper clad steel wires 15, 16, 17, 18, 19 and 20 are twisted around the center wire 12. The outer copper clad steel wires 15, 16, 17, 18, 19 and 20 also have a steel core surrounded by a cladding layer in the embodiments of the present invention. Although the illustrated embodiment shows six outer CCS wires 15, 16, 17, 18, 19 and 20 around one center wire 12, other configurations could be made, such as eight around one, nine around one, ten around three, etc.

An outer coating K is formed over at least one of the plurality of outer copper clad steel wires 15, 16, 17, 18, 19 and 20. For example, in FIGS. 1 and 2, the coating K is formed over the first outer CCS wire 15. The outer coating K has an appearance, e.g., color, which does not resemble copper. For example, the outer coating K may be opaque and of a color other than a copper color (e.g., white, black, silver, red) to block visibility of the copper beneath it.

In one embodiment, the outer coating K is a layer of metal, such as tin or zinc. However, other metals or alloys may be used. In a further embodiment, the outer coating is a paint or alternatively, a thin coating of polyethylene (PE) or similar polymer material having a color different than copper (such as black, white, red or silver).

FIGS. 3 and 4 show a wire 21, such as a grounding wire, in accordance with a second embodiment. The wire 21 includes a center wire 22. In one instance, the center wire 22 has a steel core 23 and a copper clad layer 24 surrounding the steel core 23. However, in other instances (such as FIGS. 7 and 8), the center wire 22 could be an all steel wire.

A plurality of outer copper clad steel wires 25, 26, 27, 28, 29 and 30 are twisted around the center wire 22. Although the illustrated embodiment shows six outer CCS wires 25, 26, 27, 28, 29 and 30 around one center wire 22, other configurations could be made.

An outer coating K is formed over at least one of the plurality of outer copper clad steel wires 25, 26, 27, 28, 29 and 30. For example, in FIGS. 3 and 4, the coating K is formed over the first and fourth outer CCS wires 25 and 28. The outer coating K has an appearance which does not resemble copper, and is structured as discussed above.

FIGS. 5 and 6 show a wire 31, such as a grounding wire, in accordance with a third embodiment. The wire 31 includes a center wire 32. In one instance, the center wire 32 has a steel core 33 and a copper clad layer 34 surrounding the steel core 33. However, in other instances (such as FIGS. 7 and 8), the center wire 32 could be an all steel wire.

A plurality of outer copper clad steel wires 35, 36, 37, 38, 39 and 40 are twisted around the center wire 32. Although the illustrated embodiment shows six outer CCS wires 35, 36, 37, 38, 39 and 40 around one center wire 32, other configurations could be made.

An outer coating K is formed over at least one of the plurality of outer copper clad steel wires 35, 36, 37, 38, 39 and 40. For example, in FIGS. 5 and 6, the coating K is formed over the first, fourth and sixth outer CCS wires 35, 38 and 40. The outer coating K has an appearance which does not resemble copper, and is structured as discussed above.

FIGS. 7 and 8 show a wire 41, such as a grounding wire, in accordance with a fourth embodiment. The wire 41 includes a center wire 42. In this embodiment, the center wire 42 has a steel core 43 only and no outer layers.

A plurality of outer copper clad steel wires 45, 46, 47, 48, 49 and 50 are twisted around the center wire 42. Although the illustrated embodiment shows six outer CCS wires 45, 46, 47, 48, 49 and 50 around one center wire 42, other configurations could be made.

An outer coating K is formed over at least one of the plurality of outer copper clad steel wires 45, 46, 47, 48, 49 and 50. For example, in FIGS. 7 and 8, the coating K is formed over the first, second and third outer CCS wires 45, 46 and 47, which produces a "barber pole" look, like the previous embodiments. If desired, the coating K could be formed over all of the plurality of outer copper clad steel wires 45, 46, 47, 48, 49 and 50. The outer coating K has an appearance which does not resemble copper, and is structured as discussed above.

Figure 10:
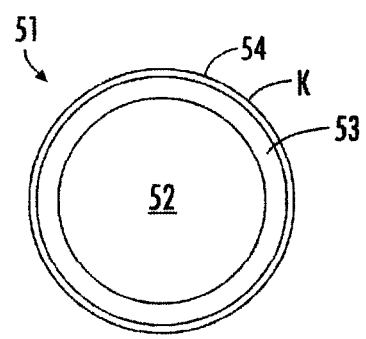
FIG. 10 is a cross sectional view taken along line X-X in FIG. 9.
Figure 11:
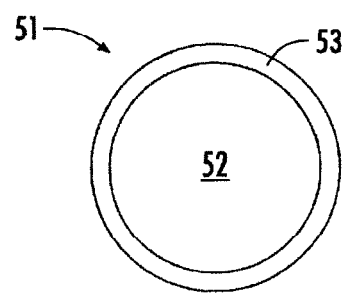
FIG. 11 is a cross sectional view taken along line XI-XI in FIG. 9.

FIGS. 9-11 show a wire 51, such as a grounding wire, in accordance with a fifth embodiment. The wire 51 is not stranded. In one embodiment, the wire 51 is a copper clad steel (CCS) wire having a steel core 52 and a copper clad layer 53 surrounding the steel core 52.

An outer coating K, structured as described above, is applied over at least portions of the CCS grounding wire 51. In the fifth embodiment, the coating K is a series of rings 54 around a perimeter of the wire 51.

Figure 12:
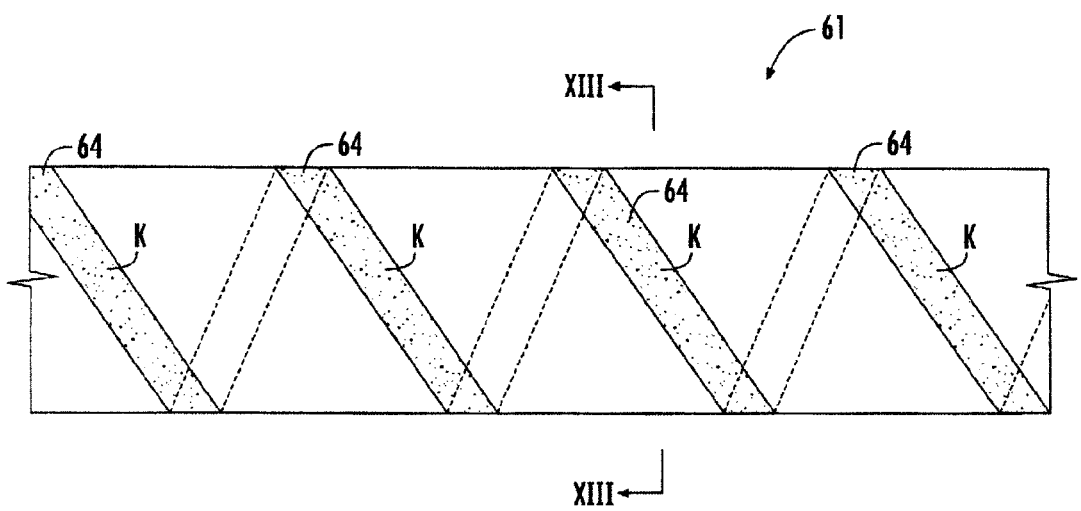
FIG. 12 is a side view of a CCS wire in accordance with a sixth embodiment of the present invention.
Figure 13:
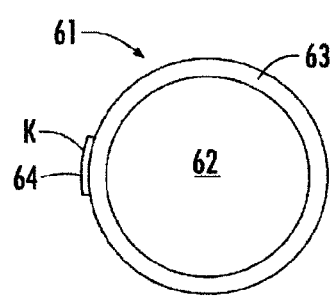
FIG. 13 is a cross sectional view taken along line XIII-XIII in FIG. 12.

FIGS. 12-13 show a wire 61, such as a grounding wire, in accordance with a sixth embodiment. The wire 61 is not stranded. In one embodiment, the wire 61 is a copper clad steel (CCS) wire having a steel core 62 and a copper clad layer 63 surrounding the steel core 62.

An outer coating K, structured as described above, is applied over at least portions of the CCS grounding wire 61, up to and including the entire outer perimeter surface of the CCS grounding wire. In the sixth embodiment, the coating K is a helical strip 64 which goes both around a perimeter of the wire 61 and extends along a length of the wire 61.

Figure 14:
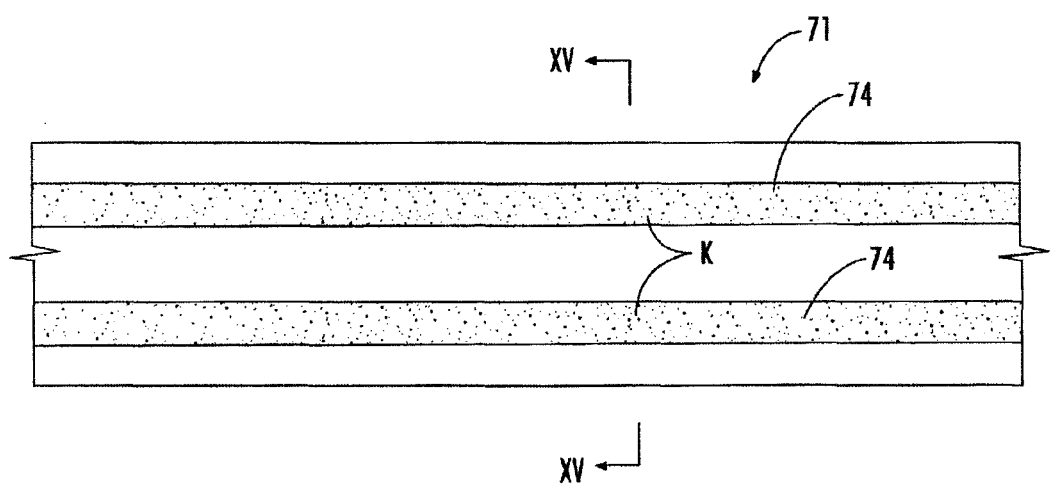
FIG. 14 is a side view of a CCS wire in accordance with a seventh embodiment of the present invention.
Figure 15:
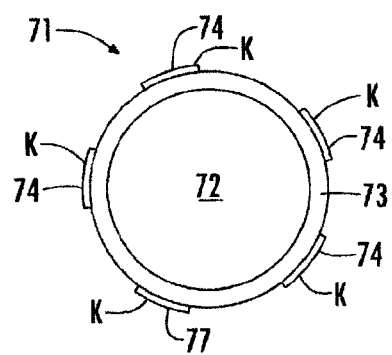
FIG. 15 is a cross sectional view taken along line XV-XV in FIG. 14.

FIGS. 14-15 show a wire 71, such as a grounding wire, in accordance with a seventh embodiment. The wire 71 is not stranded. In one embodiment, the wire 71 is a copper clad steel (CCS) wire having a steel core 72 and a copper clad layer 73 surrounding the steel core 72.

An outer coating K, structured as described above, is applied over at least portions of the CCS grounding wire 71. In the seventh embodiment, the coating K includes at least one strip 74, such as two to five strips 74, extending along a length of the wire 71.

Figure 16:
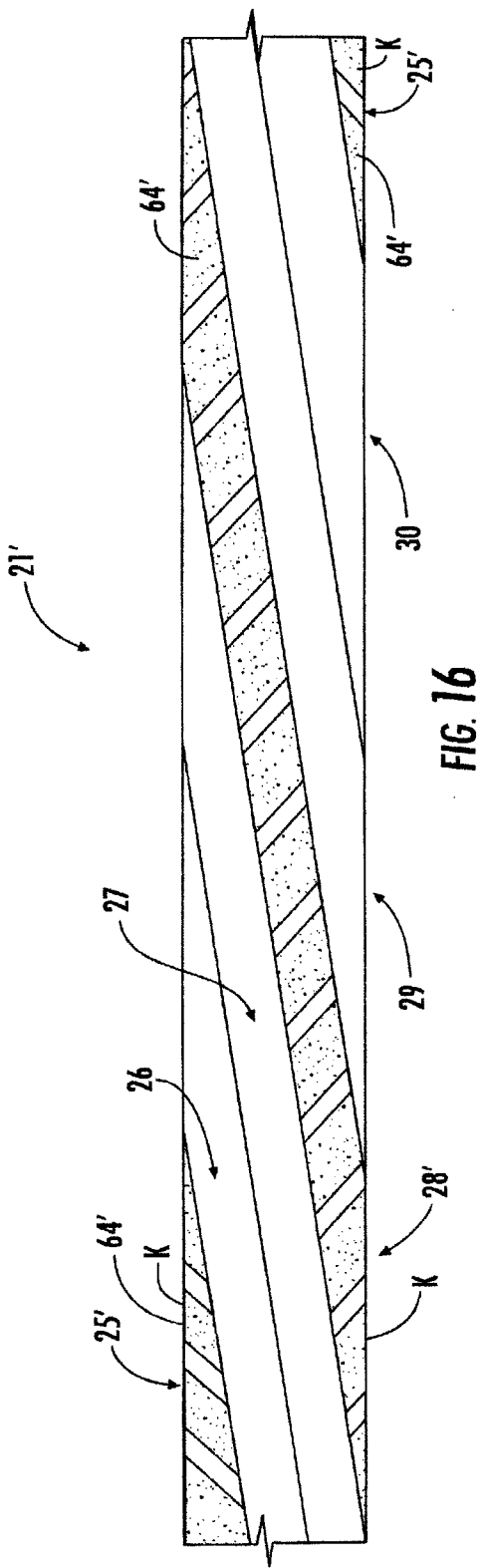
FIG. 16 is a side view of a CCS wire in accordance with an eighth embodiment of the present invention.

Two versions of a wire, such as a ground wire, have been illustrated above, a single wire and a stranded wire, where multiple wire elements are stranded together to form a single stranded wire. It would be possible to use any of the marking techniques for the single wire (FIGS. 9-15) for the "marked" one or more outer CCS wires of the stranded wires (FIGS. 1-8). For example, FIG. 16 shows a wire 21', such as a grounding wire, in accordance with an eighth embodiment. A helical strip 64' of coating K (similar to the helical strip 64 of FIG. 12) could be formed on the first and fourth outer CCS wires 25' and 28' of a twisted wire 21' (like the wire 21 of FIG. 3).

The marking techniques of the present invention make it very easy to distinguish a copper clad steel wire from an all-copper wire and are intended to alert persons that the wire is different from an all-copper wire, which may deter theft of the wire.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

We claim:

1. A stranded wire comprising:
a center wire;
a plurality of outer copper clad steel wires twisted around said center wire; and
a coating covering at least portions of at least one of said plurality of outer copper clad steel wires, wherein said coating has an appearance different than copper, wherein a first wire of said plurality of outer copper clad steel wires has an outer appearance of copper, wherein said coating completely covers said at least one of said plurality of outer copper clad steel wires.

2. A stranded wire comprising:
a center wire;
a plurality of outer copper clad steel wires twisted around said center wire; and
a coating covering at least portions of at least one of said plurality of outer copper clad steel wires, wherein said coating has an appearance different than copper, wherein a first wire of said plurality of outer copper clad steel wires has an outer appearance of copper, wherein said stranded wire has a diameter equal to or greater than 10 AWG.

3. The stranded wire of claim 2, wherein said coating only partially covers said at least one of said plurality of outer copper clad steel wires, leaving only portions of said at least one of said plurality of outer copper clad steel wires visible.

4. The stranded wire of claim 3, wherein said coating forms a helix around said at least one of said plurality of outer copper clad steel wires.

5. The stranded wire of claim 2, wherein said coating is a layer of metal.

6. The stranded wire of claim 5, wherein said layer of metal is tin or zinc.

7. The stranded wire of claim 2, wherein said coating is a polymer.

* * * * *